US012367185B1

(12) United States Patent
Gupta et al.

(10) Patent No.: US 12,367,185 B1
(45) Date of Patent: Jul. 22, 2025

(54) REPLICATION SYSTEM FOR DATA MIGRATION

(71) Applicant: Amazon Technologies, Inc., Seattle, WA (US)

(72) Inventors: Krit Gupta, Vancouver (CA); Sunil Venkayala, Shrewsbury, MA (US); Avijit Borthakur, Hillsborough, CA (US); Michael Surkan, Bellevue, WA (US); John Winford, Seattle, WA (US); Daniel Joseph Sheridan, Canaan, NH (US); Sathish Sampath, Redmond, WA (US); Mykyta Sokolov, North Bend, WA (US); Igor Bekelman, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 18/067,137

(22) Filed: Dec. 16, 2022

(51) Int. Cl.
*G06F 16/00* (2019.01)
*G06F 11/14* (2006.01)
*G06F 11/16* (2006.01)
*G06F 16/21* (2019.01)
(Continued)

(52) U.S. Cl.
CPC ........ *G06F 16/214* (2019.01); *G06F 11/1479* (2013.01); *G06F 11/1658* (2013.01);
(Continued)

(58) Field of Classification Search
CPC ...... G06F 16/221; G06F 16/214; G06F 16/27; G06F 16/245; G06F 16/273;
(Continued)

(56) References Cited

U.S. PATENT DOCUMENTS 9,785,691 B2 * 10/2017 Wong ............... G06F 16/27
10,021,120 B1 * 7/2018 Salour ............... G06F 21/6227
(Continued)

FOREIGN PATENT DOCUMENTS

WO WO2004081762 A2 * 9/2004
WO WO2013137898 A2 * 9/2013
(Continued)

OTHER PUBLICATIONS

Anoop Kumar Pandey et al., "A Survey of Storage Remote Replication Software", 2014 3rd International Conference on Eco-friendly Computing and Communication Systems (2014, pp. 45-50).*
(Continued)

*Primary Examiner* — Srirama Channavajjala
(74) *Attorney, Agent, or Firm* — Knobbe Martens Olson & Bear LLP

(57) ABSTRACT

Systems and techniques are disclosed for determining and provisioning and data resources for use in migrations data processing systems. Source data processing system metadata may be used to estimate data storage requirements for a migration and subtask parameters may be used to determine processing requirements. Migration resources may be determined based on these requirements and provisioned to perform migration operations. A migration may be monitored for resource utilization and resources allocated to the migration may be adjusted to increase migration efficiency and performance.

20 Claims, 10 Drawing Sheets

(51) Int. Cl.
  *G06F 16/22* (2019.01)
  *G06F 16/23* (2019.01)
  *G06F 16/245* (2019.01)
  *G06F 16/27* (2019.01)
(52) U.S. Cl.
  CPC ........ *G06F 16/221* (2019.01); *G06F 16/2308* (2019.01); *G06F 16/2358* (2019.01); *G06F 16/245* (2019.01); *G06F 16/27* (2019.01); *G06F 16/273* (2019.01)
(58) Field of Classification Search
  CPC ............. G06F 16/2358; G06F 16/2308; G06F 11/1658; G06F 11/1479; G06F 11/1474; G06F 11/203; G06F 11/2069; G06F 11/3428
  USPC ......................................................... 707/634
  See application file for complete search history.

(56) References Cited

U.S. PATENT DOCUMENTS

| | | | |
|---|---|---|---|
| 10,754,741 B1* | 8/2020 | Sethuramalingam | G06F 11/203 |
| 11,442,818 B2* | 9/2022 | Greenwood | G06F 11/1662 |
| 11,875,169 B2* | 1/2024 | Igelka | G06F 9/4856 |
| 2003/0093413 A1* | 5/2003 | Dettinger | G06F 16/27 |
| 2008/0195672 A1* | 8/2008 | Hamel | G06F 16/273 |
| 2008/0229031 A1* | 9/2008 | Villarreal | G06F 9/5088 711/153 |
| 2017/0060628 A1* | 3/2017 | Tarasuk-Levin | H04L 63/0209 |
| 2020/0089776 A1* | 3/2020 | Gruszecki | G06F 17/14 |
| 2020/0125582 A1* | 4/2020 | O'Shaughnessy | G06F 16/245 |
| 2021/0382797 A1* | 12/2021 | Tatiparthi | G06F 11/203 |
| 2022/0318105 A1* | 10/2022 | Subramanian | G06F 11/2069 |
| 2022/0345524 A1* | 10/2022 | Mitkar | G06F 16/214 |
| 2022/0398515 A1* | 12/2022 | McGuire | G06F 11/3428 |

FOREIGN PATENT DOCUMENTS

| | | |
|---|---|---|
| WO | WO2013171787 A2 * | 11/2013 |
| WO | WO2018217244 A1 * | 11/2018 |

OTHER PUBLICATIONS

Amina Mseddi et aal., "On optimizing replica migration in distributed cloud storage systems", 2015 IEEE 4th International Conference on Cloud Networking (CloudNet) (2015, pp. 191-197).*

* cited by examiner

REPLICATION SYSTEM FOR DATA MIGRATION

BACKGROUND

With the increase in computer processing and storage capabilities, the use of data processing systems to process and store large amounts of data has grown exponentially in recent years. The use of remote and decentralized data processing and storage systems, often referred to as "cloud" systems, has also grown exponentially in recent years as network capacity and quality has improved. Many types of organizations and users interact with cloud data processing and storage systems and other types of data processing systems to perform a variety of operations. For example, data processing systems are routinely used for sales transactions, financial transactions, social media interactions, providing entertainment content, controlling equipment and infrastructure, and storing any data related to such functions. Performing such functions may generate large amounts of data.

As the amount of data that an organization stores grows, the organization may need to move, or migrate, such data and/or the associated data processing services to larger and/or updated resources. For example, an organization may determine that it would be more cost effective to move data processing and storage services to a cloud-based system from physical resources that they currently operate and maintain. In another example, a system operator may wish to migrate data storage and/or processing resources from one cloud-based system to another (e.g., for improved service, to reduce costs, to maintain replicate data for backup purposes, etc.). In either migration situation, the resources used to perform such a migration may be significant due to the potentially large amount of data involved. If there are too few migration resources allocated to such a migration, the migration may take an overly long amount of time and data processing services may be negatively impacted. If there are too many migration resources allocated to such a migration, the cost may become excessive and migration resources may not be used efficiently and/or may be wasted. Determining an appropriate and efficient allocation of migration resources for a large-scale data migration may, at times, be challenging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
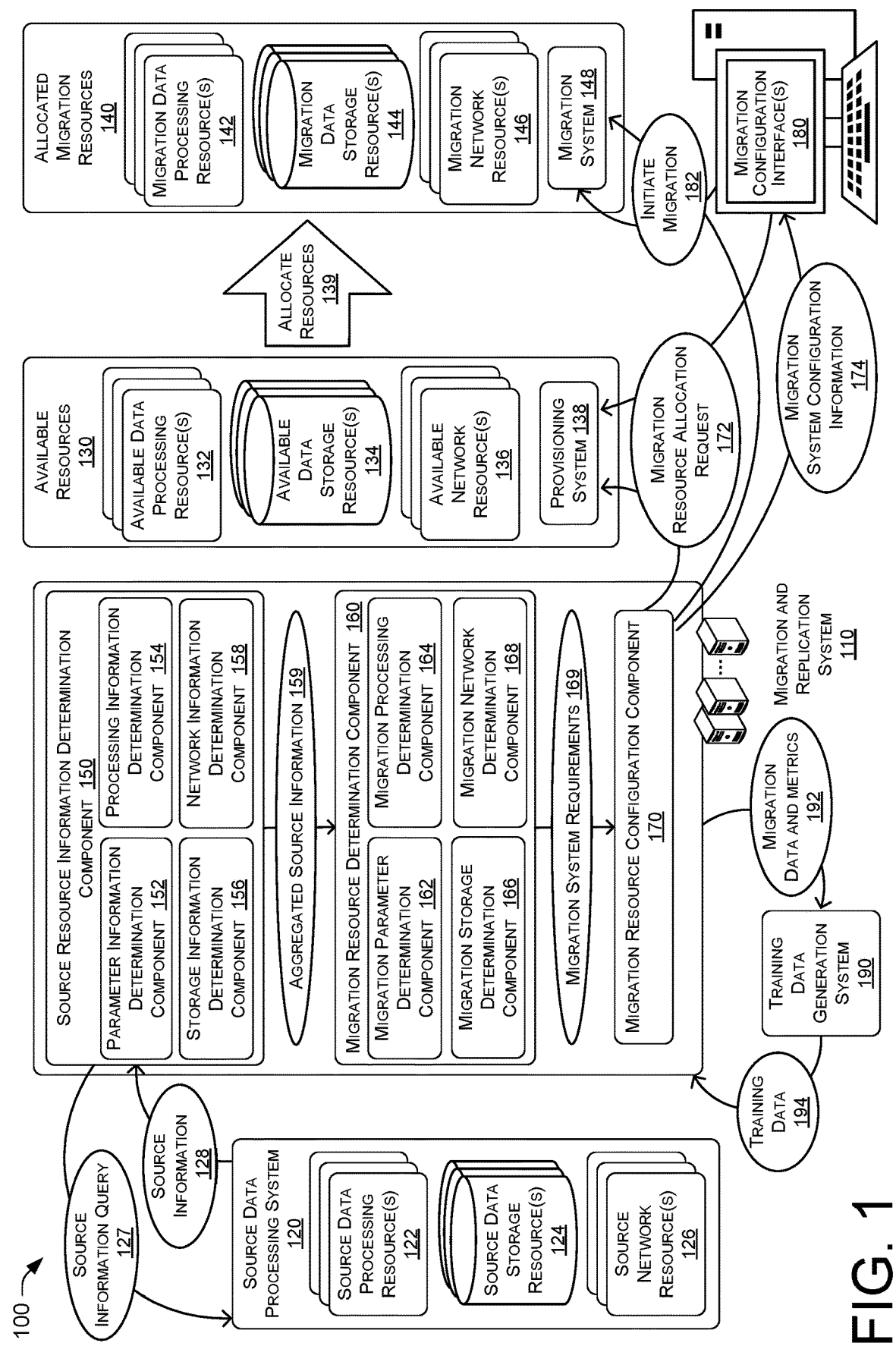
FIG. 1 illustrates a system-architecture diagram of an example environment in which a migration and replication system may be implemented.

A data processing and storage system ("data processing system") may be used to process and/or store large amounts data for system operators and customers of various types. For example, a business may be an operator of such a system and may provide access to the data processing system to perform various types of transactions. Many such systems perform large quantities of processing operations and each such operation may generate data that the system may then store in one or more data storage resources.

Over time, a data processing system operator may determine that the data stored at its data processing system and/or the processing functions performed at the system may need to be relocated to other resources. For example, an operator that maintains its own physical hardware may find that such maintenance is becoming too costly and/or prone to outages due to component failures. This operator may determine to move the storage and processing functions of its system to a cloud-based system and/or another alternative system. In another example, an operator of a data processing system may determine a need to replicate the functionality of its system, for example, for use as back-up in the event of a primary system failure or maintenance requirements. There may be numerous reasons that a data processing system operator may determine that the system's data storage and/or processing functions should be replicated at one or more other data processing systems.

The migration of data and/or processing functions from one data processing system to another may not be trivial given the scope and size of many modern data processing systems. Therefore, particular migration resources may be provisioned specifically for such a migration operation. However, it may be difficult to determine the type and quantity of such migration resources. If too few resources are allocated to the migration, the migration may take a long time and may risk impacting the production environment provided by the data processing system involved in the migration. On the other hand, it may be costly and inefficient to allocate too many resources to such a migration. The particular types of resources allocated may also impact the migration. For example, if there are adequate data storage resources provisioned for a migration with too few data processing resources or data networking resources, there may be plenty of storage space for migration data, but the migration may take an overly long amount of time due to inefficient processing and/or transmission of such data. Without a method of determining an appropriate amount of migration resources needed to migrate a system, the resulting migration may be unpredictable, which may be the least desirable condition as such unpredictability may not allow an operator to effectively plan for maintaining services during the migration.

A migration and replication system may provide an accurate determination of the migration resources requirements for migrating a data processing system. Based on such a determination, the migration and replication system may determine one or more particular combinations of migration resources of various types that may efficiently perform the migration operations. The migration and replication system may further automatically provision such resources and facilitate the migration. The migration and replication system may also, or instead, monitor a migration and adjust the resources allocated to the migration to increase migration efficiency over time.

In various examples, an operator of a particular data processing system ("source data processing system") may decide to migrate the data stored at that system and/or the processing functions performed at that system to another data processing system ("destination data processing system" or "target data processing system"). This migration may be due to a desire to move the source data processing system to an improved computing environment with more and/or better available resources, to replicate the source data processing system for redundancy purposes, and/or for any number of other reasons that will be recognized by those skilled in the art. A migration and replication system may perform various operations that improve the efficiency of performing such a migration.

A migration and replication system may detect a request, instruction, or other condition that indicates a migration of a source data processing system to a destination data processing system and/or a migration of any subset of resources and/or data associated with the source data processing system to the destination data processing system. This request may include various parameters, such as indications of the source and/or destination systems, attributes and/or parameter associated with the source and/or destination systems, as well as requesting operator preferences or parameters, as described in more detail herein.

Based on this migration request, the migration and replication system may query the source data processing system and/or a system associated therewith for information associated with the current resource allocation at the source data processing system. For example, the migration and replication system may request metadata from a component associated with the source data processing system that tracks the utilization of data storage resources in the source data processing system for metadata indicating the attributes of such data storage resources. The requested data may also, or instead, request information associated with data processing resources, data networking resources, and/or system parameters configured at the source data processing system. Such metadata may indicate, for instance, the number of data structures of particular types used at the source data processing system to store data, the types of data stored at such data structures, the size (e.g., data volume) consumed by such structures and/or by the various types of data stored at such data structures, etc. Such metadata may also, or instead, indicate processing resource attributes for various data processing resources that may be configured at the source data processing system. Such metadata may also, or instead, indicate networking resources attributes for various networking resources that may be configured at the source data processing system. This metadata may further, or instead, indicate any related parameters and/or other information that may be associated with the source data processing system and/or any one or more resources associated therewith.

Further based on the migration request, the migration and replication system may query one or more destination data processing systems and/or a system associated therewith for information associated with the current resource allocation at the destination data processing system(s). For example, the migration and replication system may request metadata from a component associated with the destination data processing system(s) that indicates information associated with data processing resources, data networking resources, and/or system parameters configured at the destination data processing system(s). Such metadata may indicate, data storage, processing, and/or networking capabilities of the destination data processing system(s). This metadata may further, or instead, indicate any related parameters and/or other information that may be associated with the destination data processing system(s) and/or any one or more resources associated therewith.

Using the collected source data processing system information, the migration and replication system may determine one or more migration resources that may be capable of performing the operations required to implement the requested migration. For example, the migration and replication system may determine, based on various calculations as described in more detail below, an estimate of the total amount of data that will be migrated from the source data processing system to the destination data processing system. The migration and replication system may then determine, based on this determined total amount of data, one or more data storage resources appropriate for migrating this amount of data. For example, for a certain number of terabytes of data, the migration and replication system may determine that a first number of data storage resources of 100 gigabyte capacity each may be used or a second number of data storage resources of 500 gigabyte capacity each may be used.

The migration and replication system may also take into account one or more of the requesting operator's parameters or preferences. For example, an operator's request to perform a migration may include a requested or maximum number of subtasks to be allocated to the migration. Each subtask (may also be referred to as a "thread") of a migration operation may represent one or more data processing resources. Each such subtask, thread, and/or data processing resource associated with the migration operation may have an associated financial cost. The operator may specify a (e.g., maximum, requested) number of subtasks that may be allocated to this operation (e.g., to limit costs). The migration and replication system may determine, based on the requested subtask parameter, the number of subtasks to provision for the migration. In some examples, this may also affect the determination of storage resources. For example, a greater number of subtasks may be capable of processing a greater number of storage resources. Therefore, smaller capacity storage resources may be used for a faster overall performance of the migration. Alternatively, if fewer subtasks are available, the migration and replication system may determine that fewer, but larger, storage resources may be used for the migration.

The operator may also, or instead, specify a maximum length of time within which the migration operation is to be completed (e.g., to minimize the impact of the migration and/or the amount of time the source and destination systems may not be synchronized). The migration and replication system may determine, based on the requested migration time, the number of subtasks to provision for the migration. In some examples, this may also affect the determination of storage resources. For example, a greater number of subtasks may be capable of processing a greater number of storage resources. Here again, smaller capacity storage resources may be used for a faster overall performance of the migration (e.g., to ensure the migration is completed within the requested timeframe). The migration and replication system may also reduce the number of subtasks and use fewer, but larger, storage resources if doing so allows the migration to be completed within the requested timeframe. This may reduce costs for the operator and increase the efficiency of resource utilization.

The migration and replication system may also determine one or more migration data networking resources that may be capable of implementing the requested migration, for example within the requesting operator's provided parameters or constraints. For example, the migration and replication system may determine one or more networking resources that may be capable of transmitting within the required timeframe the amount of data to be migrated using a variety of combinations of data processing resources and data storage resources available to process and store the data during the migration. The migration and replication system may then determine the one or more networking resources to use that will satisfy the migration requirements (e.g., most efficiently).

Using the determined data storage, processing, and/or networking migration resources, the migration and replication system may initiate the migration. In various examples, the migration and replication system may automatically provision, or request provisioning, of the migration resources and may then instruction the components associated with the migration to begin the migration using such resources. Alternatively, the migration and replication system may provide an indication of the determined migration resources to an operator or other entity for approval and/to initiation of the migration process.

In various examples, the resource requirements of the migration may change while the migration is underway. For example, the migration resources determined by the migration and replication system may be maintained over time so that data may be relatively continuously migrated from the source system to the destination system as it is generated at the source system (e.g., where the destination system is a back-up system for the source system). In another example, the data stored at the source system may increase during the migration due to (e.g., unexpected) conditions (e.g., an outage at a related system, sudden spike in user traffic due to an event, etc.). The migration and replication system may monitor the migration resources in use during a migration and may take steps to scale such resources as needed to fit various criteria of the migration.

For example, the migration and replication system may determine that a migration data processing resource may be approaching a threshold high utilization level. In response, for instance to ensure that the migration can be performed in a timely manner, the migration and replication system may adjust the data processing resources dedicated to the migration. For example, the migration and replication system may provision one or more additional data processing resources (e.g., of the same type and/or capacity of those currently in use) for the migration and initiate the use of such resources in migrating data. Alternatively or additionally, the migration and replication system may provision one or more replacement data processing resources (e.g., of a greater capacity and/or different type than those currently in use) that may be better suited for the increased processing needs of the migration. Alternatively or additionally, the migration and replication system may adjust or modify one or more of the data processing resources currently in use (e.g., to increase the processing capabilities of such resources). The migration and replication system may adjust or modify one or more of the data storage migration resources currently in use and/or one or more of the data networking migration resources currently in use in a similar manner based on corresponding high utilization thresholds for such resources.

The migration and replication system may also, or instead, take actions to increase the efficient usage of migration resources when one or more such resources may be underutilized. For example, the migration and replication system may determine that a migration data processing resource may be approaching a threshold low utilization level. In response, for instance to free up resources that may be better used in other operations, the migration and replication system may adjust the data processing resources dedicated to the migration. For example, the migration and replication system may release one or more data processing resources from the migration and continue the migration using the remaining (fewer) data processing resources. Alternatively or additionally, the migration and replication system may provision one or more replacement data processing resources (e.g., of a lesser capacity and/or different type than those currently in use) that may be better suited for the reduced processing needs of the migration. Alternatively or additionally, the migration and replication system may adjust or modify one or more of the data processing resources currently in use (e.g., to decrease the processing capabilities of such resources). The migration and replication system may adjust or modify one or more of the data storage migration resources currently in use and/or one or more of the data networking migration resources currently in use in a similar manner based on corresponding low utilization thresholds for such resources.

The migration and replication system also, or instead, determine that a migration is complete and may, in response, release or request the release of the migration resources that were provisioned for the migration. Alternatively, the migration and replication system may maintain such resources and associated them with the source and destination systems to perform ongoing migration operations (e.g., to provide back-up service for the source system). In such examples, the migration and replication system may monitor the ongoing migration operations and adjust the migration resources as described herein based on resource operating conditions.

In various examples, the migration and replication system may determine migration metrics, status, resource determinations, and/or any other data associated with a migration and the resource determination associated therewith and may provide such data to an operator and/or one or more systems. For example, the migration and replication system may use migration data and/or metrics as training data to train and/or otherwise improve the performance of one or more of the resource determination systems disclosed herein (e.g., one or more machine-learned models executed therein).

In various examples, a migration may fail for one or more reasons. In such examples, the migration and replication system may determine one or more causes of the failure and/or may collect and/or report data associated with the failure to an operator and/or one or more systems. For example, the migration and replication system may use failure data (e.g., lack of adequate processing, storage, and/or networking resources) as training data and/or migration metrics that may be used to train and/or otherwise improve the performance of one or more of the resource determination systems disclosed herein (e.g., one or more machine-learned models executed therein).

In various examples, more than one destination data processing system may be involved in a migration. For example, a particular migration (e.g., as indicated in the associated operator-provided parameters) may be a migration of data from a source data processing system to multiple separate and distinct destination data processing systems. In such examples, the migration and replication system may determine and provision migration resources based on the multiple destination systems. The migration and replication system may initiate, monitor, and determine a status for such a migration as described herein. As will be appreciated, the disclosed systems and techniques set forth herein may be applied to migrations having any number of source data processing systems migrating data to any number of destination data processing systems.

The disclosed systems and techniques provide a more accurate means of efficiently provisioning data processing and storage resources for data processing system migrations while satisfying user and system requirements. By facilitating a more accurate determination of source data processing system storage and/or data processing utilization, migration resources may be more accurately determined that are capable of performing a migration within the constraints provided by operator parameters and system capabilities. For example, in current implementations, rough estimates based on limited data and/or guesswork are typically used to determine the resources provisioned to a migration, resulting in many wasted resources when too many resources and/or resources of too large a capacity are allocated to a migration. Alternatively, when inadequate or too few resources are allocated to a migration, the migration may be slow and unpredictable, resulting in negative impact to operational systems. In the disclosed systems, representative information from metadata for a source data processing system may be used to determine an accurate estimate of the data storage capacity currently in use in such a system. Using this estimate, a migration and replication system may accurately determine the numbers and types of data storage resources that may be capable of performing the migration. The migration and replication system may further select the combination of data processing resources and storage resources that may most efficiently implement the migration based on system operator requirements. By more efficiently allocating resources for a migration, the usage of such resources may be optimized and the number of extraneous processor cycles and wasted storage resource may be reduced. Thus, the disclosed systems and techniques help reduce resource utilization of the various data processing systems involved in a migration and increase the speed of such a migration, increasing the efficiency and reducing the costs of large scale data migrations.

The techniques and systems described herein may be implemented in a number of ways. Example implementations and additional details are provided below with reference to the following figures.

FIG. 1 is a block diagram of an illustrative environment 100 that may be a portion of, or otherwise associated with, a cloud data processing and storage system or any other type of data processing and/or storage system. The environment 100 may include a migration and replication system 110 and a source data processing system 120. The environment 100 may also include migration configuration interface(s) 180 that may facilitate user interaction with the migration and replication system 110 in various examples and presentation of one or more migration configuration and/or operation interfaces to a user. The environment 100 may also include available resources 130 that may represent one or more data processing resources, one or more data storage resources, and/or one or more data networking resources that may be available for use in a migration, as well as a provisioning system 138 that may provision such resources. The environment 100 may also include allocated migration resources 140 that may represent one or more data processing resources, one or more data storage resources, and/or one or more data networking resources that may be allocated to a migration, as well as a migration system 148 that may implement a migration and/or otherwise make use of the resources allocated to a migration. The systems 110, 120, 130, and 140, as well as the interface(s) 180, may each represent one or more physical and/or logical resources, such as one or more server computers, virtual machines, software resources, databases, notebooks clusters, datasets, etc., or any combination thereof.

The migration and replication system 110 may be configured with various components and to perform various operations as described herein to implement various migration configurations and operations. In various examples, the migration and replication system 110 may include a source resource information determination component 150 that may facilitate determination of resource utilization and/or configuration parameters at a source data processing system. For example, the source resource information determination component 150 may include a parameter information determination component 152 that may determine one or more (e.g., configuration) parameters for a source data processing system. The source resource information determination component 150 may also, or instead, include a processing information determination component 154 that may determine data processing information for a source data processing system. The source resource information determination component 150 may also, or instead, include a storage information determination component 156 that may determine data storage information for a source data processing system. The source resource information determination component 150 may also, or instead, include a network information determination component 158 that may determine data networking information for a source data processing system. In various examples, the source resource information determination component 150 may be implemented as or otherwise include a machine-learned model trained to determine source data as described herein. Such a model may be trained, at least in part, on data based on the results of migration, for example training data 194 generated by training data generation system 190 using migration data and metrics 192 associated with migrations implemented and/or initiated by the migration and replication system 110 and/or one or more components associated therewith.

In an example, the migration and replication system 110 may detect or receive an instruction indicating that the source data processing system 120 is to be migrated to a destination data processing system (not shown). The source data processing system may include one or more source data processing resources 122, one or more source data storage resources 124, and/or one or more source network resources 124. These resources may represent any number and combination of one or more physical and/or logical resources (e.g., server computers, virtual machines, software resources, databases, clusters, datasets, logical and/or physical data connections, etc.).

The source resource information determination component 150 may transmit a source information query 127 to the source data processing system 120. This query may be one or more requests for information and/or statistics regarding the resources (processing, networking, and/or storage) currently in use at the source data processing system 120. The query 127 may be specifically a request for environment data and/or other metadata indicating such resource utilization within the source system 120. The query 127 may be also, or instead, be a request for environmental statistics and/or other statistics associated with one or more resources implemented within the source system 120. The source system 120 may reply with source information 128 that may be one or more responses that may include or otherwise indicate data associated with the source data processing system 120. For example, the source information 128 may include indications of data structure types and sizes associated with source data storage resource(s) 124; data processing types and capacities associated with source data processing resource(s) 122; data throughput, capabilities, and/or statistics associated with source network resource(s) 126; and/or one or more parameters (e.g., system, component, and/or resource configuration parameters) associated with the source data processing system 120. In various examples, the query 127 and the response 128 may be (e.g., direct) interactions between the source data processing system 120 and the migration and replication system 110 (e.g., the source resource information determination component 150) and/or may be interactions between the migration and replication system 110 (e.g., the source resource information determination components 150) and another system that stores or otherwise provides information about data processing systems such as the system 120. For example, the source data processing system 120 may regularly provide current utilization metrics to an environment datastore that may store such data for one or more data processing systems.

Using the information received via source information 128, the parameter information determination component 152 may determine one or more parameters for the source data processing system 120 (e.g., parameters generally associated with the system 120, parameters for one or more source data processing resources 122, parameters for one or more source data storage resources 124, and/or parameters for one or more source network resources 126). The processing information determination component 154 may also, or instead, use the information received via source information 128 to determine data processing information (e.g., number, type, speed, utilization, etc. of processing resources) for the source data processing system 120, for instance, for the source data processing resource(s) 122. The storage information determination component 156 may also, or instead, use the information received via source information 128 to determine data storage information (e.g., number, type, capacity, utilization, data types, data structure types, particular structures, data stored in such structures, etc.) for the source data processing system 120, for instance, for the source data storage resource(s) 124. The network information determination component 158 may also, or instead, use the information received via source information 128 to determine data networking information (e.g., capacity, utilization, statistics, etc.) for the source data processing system 120, for instance, for the source network resource(s) 126. The source resource information determination component 150, and/or components configured therein, may collect and aggregate this source data processing system information as aggregated source information 159 for use in determining migration resources.

In various examples, the migration and replication system 110 may also, or instead, include a migration resource determination component 160 that may facilitate determination of one or more migration resources for migrating a source data processing system to a destination data processing system. For example, the migration resource determination component 160 may include a migration parameter determination component 162 that may determine one or more (e.g., configuration) parameters for a migration and/or for migration resources associated therewith. These parameters may include one or more operator or user-specified parameters, such as a number of subtasks, threads, etc., and/or a requested and/or maximum length of time for a migration. The migration resource determination component 160 may also, or instead, include a migration processing determination component 164 that may determine one or more migration data processing resources and associated information. The migration resource determination component 160 may also, or instead, include a migration storage determination component 166 that may determine one or more migration data storage resources and associated information. The migration resource determination component 160 may also, or instead, include a migration network determination component 168 that may determine one or more migration data networking resources and associated information. In various examples, the migration resource determination component 160 may be implemented as or otherwise include a machine-learned model trained to determine migration resource data as described herein. Such a model may be trained, at least in part, on data based on the results of migration, for example training data 194 generated by training data generation system 190 using migration data and metrics 192 associated with migrations implemented and/or initiated by the migration and replication system 110 and/or one or more components associated therewith.

Using the aggregated source information 159, the migration parameter determination component 162 may determine one or more parameters for one or more potential migration resources (e.g., parameters generally associated with a migration system, parameters for one or more migration data processing resources, and/or parameters for one or more migration data storage resources). The migration processing determination component 164 may also, or instead, use the aggregated source information 159 to determine migration data processing resource information (e.g., type, speed, utilization, etc. of potential migration processing resources) for a migration system. For example, the migration processing determination component 164 may determine one or more types of data processing resources that may be used to perform a requested migration. The migration storage determination component 166 may also, or instead, use the aggregated source information 159 to determine migration data storage information (e.g., number, type, capacity, supported data types and/or structures, etc.) for a migration system. For example, the migration storage determination component 166 may determine one or more types of data storage resources that may be used to perform a requested migration. The migration network determination component 168 may also, or instead, use the aggregated source information 159 to determine migration data networking resource information (e.g., type, capacity, throughput, etc. of potential migration networking resources) for a migration system. For example, the migration processing determination component 164 may determine one or more types of data networking resources that may be used to perform a requested migration. The migration resource determination component 160, and/or components configured therein, may collect and aggregate determining migration resource information as migration system requirements 169 for use in determining particular migration resources.

In various examples, the migration and replication system 110 may also, or instead, include a migration resource configuration component 170 that may facilitate determination of configurations of one or more migration resources that may be capable of implementing a particular migration. For example, the migration resource configuration component 170 may use the migration system requirements 169 to determine, from available data processing resources, data storage resources, and data networking resources, particular combinations of data processing resources, data storage resources, and data networking resources that may be used to implement a requested migration in accordance with the (e.g., operator or user specified) parameters and/or constraints associated with the migration. For example, the migration resource configuration component 170 may determine combinations of particular data processing resources, data storage resources, and data networking resources that may be used together to complete a migration of the data at the source data processing system 120 within an operator-specified amount of time and/or with an operator-specified number of threads.

The available resources 130 may include the resources that are available for instantiation and usage for a migration. These resources may include available data processing resource(s) 132, available data storage resource(s) 134, and/or available network resource(s) 136 that may be any one or more types of physical and/or virtual resources. A provisioning system 138 may provision or otherwise allocate such resources for use in a migration.

The resources allocated or provisioned for a migration are represented as allocated migration resources 140 and may include migration data processing resource(s) 142, migration data storage resource(s) 144, and migration network resource(s) 146 that may be any one or more types of physical and/or virtual resources and selected based on the available resources 130. A migration system 148 may implement the migration or otherwise perform and/or control migration operations using the migration data processing resource(s) 142, the migration data storage resource(s) 144, and/or the migration network resource(s) 146.

The migration resource configuration component 170 may, based on determining one or more particular combinations of migration resources, transmit a migration resource allocation request 172 to the available resources 130. The provisioning system 138 may provision or otherwise allocate 139 migration resources 140 from among the available resources 130 based on the allocation request 172.

Alternatively or additionally, the migration resource configuration component 170 may, based on determining one or more particular combinations of migration resources, transmit migration system configuration information 174 to the migration configuration interface(s) 180. The information 174 may serve as a recommended or suggested allocation of migration resources that a user or operator, via the migration configuration interface(s) 180, may view, store modify, etc. Such a user or operator may then transmit (e.g., as recommended in information 174 and/or as modified via the interface(s) 180) the request 172 to provision migration resources. In this example, the provisioning system 138 may provision or otherwise allocate 139 migration resources 140 from among the available resources 130 based on the allocation request 172.

Once the allocated migration resources 140 (e.g., the migration data processing resource(s) 142 and migration data storage resource(s) 144) have been provisioned, the migration system 148 may initiate the migration. For example, the migration resource configuration component 170 may receive an indication or otherwise determine that the allocated migration resources 140 have been provisioned and may then transmit an instruction 182 to initiate the migration. Alternatively or additionally, an operator or user may, via interface(s) 180, receive an indication or otherwise determine that the allocated migration resources 140 have been provisioned and may then generate the instruction 182 to initiate the migration.

During the migration, the migration and replication system 110 may monitor the utilization and/or other aspects of the migration and/or the resources associated therewith and adjust them as described herein. For example, the migration and replication system 110 may interact with the available resources 130, the allocated migration resources 140, and/or any components associated therewith, to add, remove, and/or alter the resources allocated to the migration based on detecting threshold levels of utilization of the allocated resources.

The results of the migration may be detected or otherwise determined by the migration and replication system 110, for example, via communication and/or monitoring of one or more migration data resources. A status or condition of a migration may be determined that may indicate a migration success, failure, and/or any other data associated with a migration. This data may be used to adjust any one or more of the components described herein and/or to train one or more machine-learned models associated with such components. For example, the migration and replication system 110 may determine migration data and metrics 192 based on migration results and migration monitoring. This data 192 may also include the provisioned resources for migrations reflected in the data and metrics and/or any other migration data, results, etc. This data may be used by a training data generation system 190 to generate training data 194 that may be used to training one or more machine-learned models. For example, one or both of the components 150 and 160 may execute a machine-learned model. The data 194 may be used to train and/or otherwise improve the results output by such models. The training data generation system 190 may be a separate and distinct system from the migration and replication system 110 or it may be an integrated component of, or otherwise associated with, the migration and replication system 110.

An illustrative example will now be described in reference to FIG. 1. An operator of the data processing system 120 may be a business operating several websites that sell products and services. The operator may wish to migrate the data from its primary sales system implemented as source data processing system 120 to a destination data processing system (not shown) that may serve as a back-up system to the system 120. The operations may generate a request to perform this migration that may be detected at migration and replication system 110. In response to detecting the request, the source resources information determination component 150 may transmit a source information query 127 to the source data processing system 120 for metadata indicating various properties and resources details of the system 120. The system 120 may provide this requested information in source information 128.

Using the information received via source information 128, the parameter information determination component 152 may determine one or more parameters for the source data processing system 120, one or more parameters associated with one or more destination data processing systems, and/or one or more parameter associated with the migration request. For example, the parameter information determination component 152 may determine that the operator has requested 10 subtasks or threads for the migration. The processing information determination component 154 may use the information received via source information 128 to determine that the source data processing system 120 has 12 source data processing resource(s) 122 of a particular type. The processing information determination component 154 may also, or instead, use the information received via source information 128 to determine that the source data processing system 120 has 9 source data networking resource(s) 126 of a particular capacity. The storage information determination component 156 may also, or instead, use the source information 128 to determine that the source data storage resources include a database with 100 tables and the various attributes (columns, data types, sizes, etc.) of those tables. The source resource information determination component 150 may collect and/or aggregate this source data processing system information as information 159 and provide it to the migration resources determination component.

Based on the information 159, the migration parameter determination component 162 may determine one or more parameters for one or more potential migration resources, such as the 10 subtasks or threads requested by the operator for the migration. The migration processing determination component 164 may then determine that 10 single-threaded processing resources may be used for the migration and/or 5 dual-threaded processing resources may be used for the migration. The migration storage determination component 166 may use the aggregated source information 159 to determine an estimate of the volume of data stored at the source data storage resources 124 and the particular types of storage resources that may be used for the emigration. The migration network determination component 168 may determine the networking resources that may facilitate the migration of that amount of data for with the available combinations of processing and storage resources. For example, as described in more detail herein, the migration storage determination component 166 may determine that the source data storage resources 124 store an estimated 200 terabytes of data and therefore 200 storage resources of 1000 gigabyte capacity each may be used or 40 storage resources of 5000 gigabyte capacity each may be used for the migration.

These configuration parameters may be provided as requirements 169 to the migration resource configuration component 170 that may use them to generate an allocation request 172 and/or migration system configuration information 174 that may be used by an operator to generate the allocation request 172.

Based on the allocation request 172, the provisioning system 138 may use the available data processing resource(s) 132 to allocate 139 the migration data processing resources(s) 142. The provisioning system 138 may further use the available data storage resource(s) 134 to allocate 139 the migration data storage resources(s) 144. Using these allocated resources, an initiate migration instruction 182 may be provided to the migration system 148 (e.g., automatically by the migration resource configuration component 170 and/or by an operator via the interface(s) 180) that may cause the migration system 148 to initiate the migration using the allocated resources. This migration may be monitored and the allocated resources adjusted as described herein. The results and other data associated with the migration may be collected as data 192 and used by training data generation system 190 to generate training data 194 that may then be used to train and/or otherwise improve the performance of any one or more of components 150, 160, and 170, and/or any machine-learned models associated therewith.

As will be appreciated, by providing a more accurate means of determining the resources in use at a source data processing system that is to be migrated to a destination system, migration resources may be determined more effectively and migrations performed more efficiently, reducing wasted resources and improving migration performance. The systems and methods described herein may be faster, more efficient, and more robust than conventional systems and methods, as they may reduce the allocation of excess and potentially unused migration resources while ensuring that adequate migration resources are provisioned to accommodate operator and system requirements, thereby reducing the processing and memory resources used in a data processing system migration to those resources that are necessary and sufficient to properly perform the migration without resource waste. That is, the systems and methods described herein provide a technological improvement over existing migration resource allocation techniques for migrating data processing systems that involve allocating too many resources by default or too few based on inaccurate estimates, increasing the speed and efficiency of determining and allocating migration resources while freeing up resources that are not needed to adequately perform the migration.

FIGS. 2-5 are flow diagrams of illustrative processes illustrated as a collection of blocks in a logical flow graph that represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
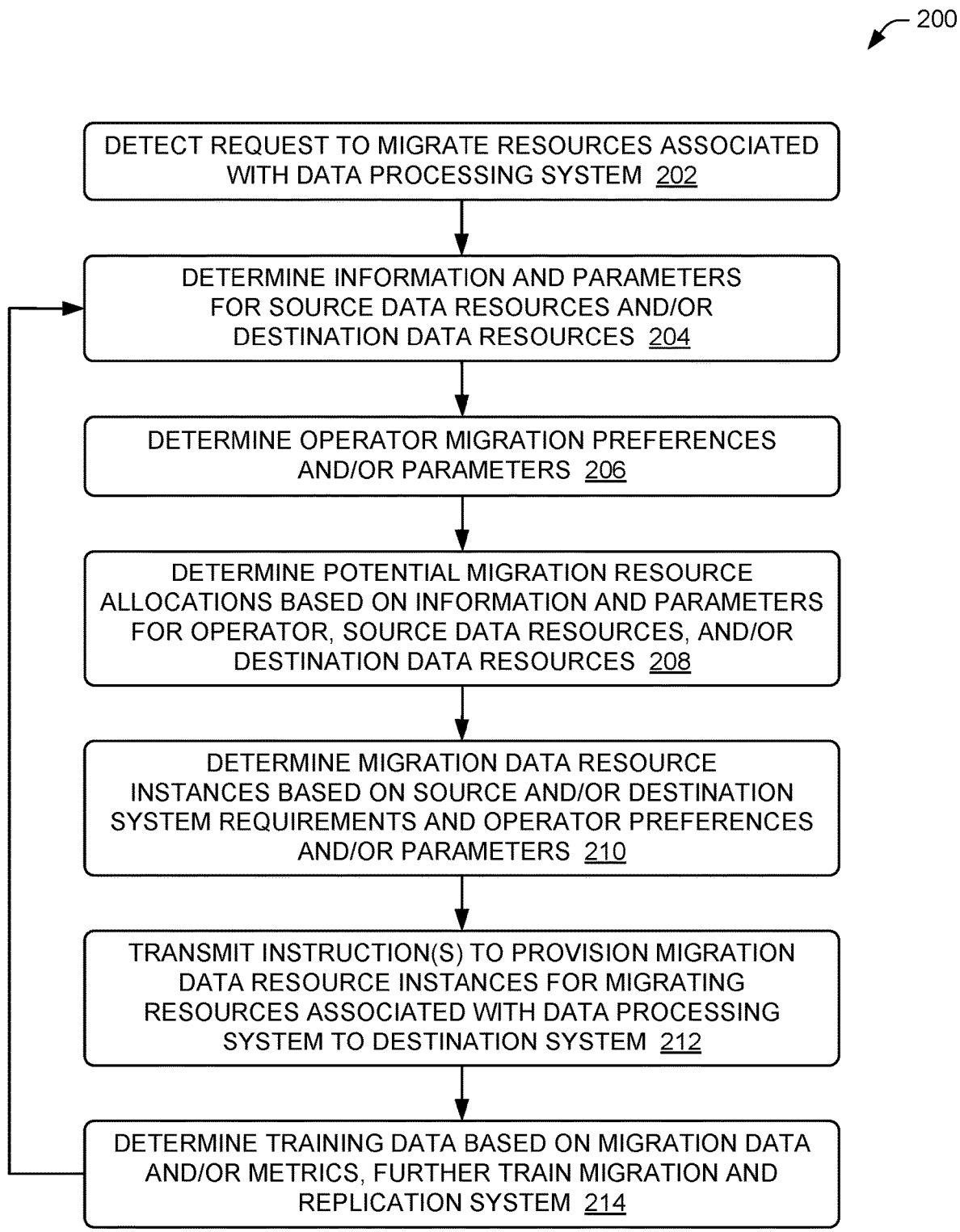
FIG. 2 illustrates a flow diagram of an example method for determining migration resources in a migration and replication system.

FIG. 2 is a flow diagram of an illustrative process 200 to facilitate the provisioning of migration data resources in a migration and replication system. The process 200 may be described at times with reference to the environment 100 and may be performed by the migration and replication system 110, but the process 200 may also, or instead, be performed in other similar and/or different environments by other similar and/or different systems.

At 202, a request to migrate resources associated with a data processing system may be detected or received. In examples, a migration and replication system may poll or otherwise query (e.g., regularly, based on one or more conditions, etc.) a system, such as an administrative system, to detect requests or conditions that indicate an instruction to migrate a system. In other examples, the migration and replication system may be received such instructions from an operator or operator system At 204, the migration and replication system may determine information and parameters associated with data resources at the source data processing system and/or at the destination data processing system. For example, as described herein, the migration and replication system may query or otherwise access data at or associated with a source data processing system to determine various data processing resources, data storage resources, data networking resources, and/or configuration parameter information that may be used in performing the migration techniques described herein. The migration and replication system may also, or instead, query or otherwise access similar data for one or more destination data processing systems. In some examples, an administrative or environment datastore may be queried for this information that is distinct from the source data processing system and/or destination data processing system(s), while in other examples one or more components of such data processing system(s) may also, or instead, be queried for such information. In some examples, the data storage resource information may be estimated based on information determined as described herein, for example, in reference to FIG. 3.

At 206, the request for migration and/or one or more other data sources may be queried or otherwise used to determine migration parameters. For example, the request for migration may include an indication of an operator's desired maximum number of threads or subtasks, a minimum or maximum migration duration, migration start time, migration end time, migration window(s) (e.g., particular day(s) (e.g., weekend days), particular times of day (at night, between 3:00 AM and 6:00 AM, etc.)), etc. The operations of 202, 204, and/or 206 may, for example, be performed by a source resource information determination component 150 and/or associated components 152, 154, 156, and/or 158 of FIG. 1.

At 208, the information determined at 204 and 206 may be used to determine the potential data processing, data storage, and/or data networking resources that may be able to perform the migration. For example, the source data storage information determined at 204 may be used to determine the particular potential data storage resources that may be used for the migrations. Referring to the example above, if a source data storage resource stores an estimated 200 terabytes of data, the migration and replication system may determine that 200 storage resources of 1000 gigabyte capacity each may be used or 40 storage resources of 5000 gigabyte capacity each may be used for the migration. Likewise, if the migration request indicated that 10 threads are to be used for the migration, the migration and replication system may determine that 10 single-threaded processing resources may be used for the migration or 5 dual-threaded processing resources may be used for the migration.

At 210, the migration and replication system may determine, based on the available resources and any other constraints, parameters, and/or preferences, the particular migration resources to use for the migration. For example, if the migration request indicates that the migration be complete with a particular duration of time, the migration and replication system may determine that a first combination of processing resources, networking resources, and storage resources may satisfy this requirement while a second combination of processing resources, networking resources, and storage resources may not. For instance, continuing the example from above, the migration and replication system may determine that using the 200 storage resources of 1000 and the 10 single-threaded processing resources may be faster than using the 40 storage resources of 5000 gigabyte with the 5 dual-threaded processing resources, and may therefore select the first combination. Alternatively, the migration and replication system may determine that either combination may accomplish the migration within the requested time and may therefore select the second combination because it may be more cost effective.

At 212, the migration and replication system may transmit instructions to a provisioning system to provision or otherwise allocate the migration resources determined at 210. This may be an automatic process or the recommended migration resources of 210 may be provided to a user or operator that may in turn manually approve or otherwise provide instructions to proceed with the recommended provisioning.

At 214, the migration and replication system may determine training data and/or other data that may be used train or otherwise reconfigure one or more of the components described herein. This data may be based on results, metrics, and/or any other data associate with an ongoing and/or terminated (e.g., successfully completed, failed, suspended, etc.) migration. Further at 214, this data may be used to train one or more models executed by or on behalf of the migration and replication system. For example, the data may be used to train or reconfigure the component that performs the operations of 204 and/or any subsequent operation.

Figure 3:
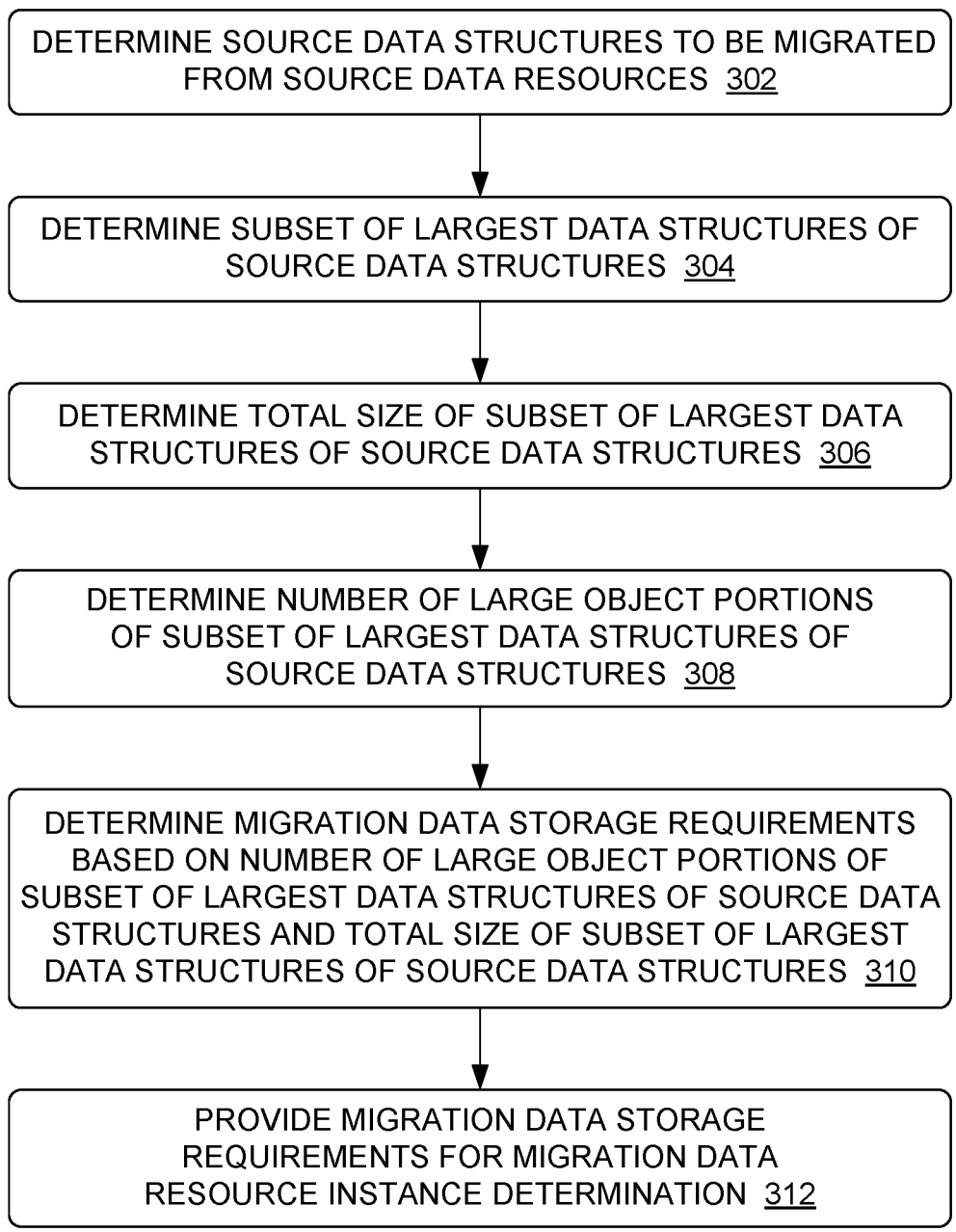
FIG. 3 illustrates a flow diagram of another example method for determining migration resources in a migration and replication system.

FIG. 3 is a flow diagram of an illustrative process 300 to facilitate the determination of migration data storage resources in a migration and replication system. The process 300 may be described at times with reference to the environment 100 and may be performed by the migration and replication system 110, but the process 300 may also, or instead, be performed in other similar and/or different environments by other similar and/or different systems.

At 302, the migration and replication system may determine the data structures stored at a source data processing system to be migrated. In examples, the migration and replication system may determine these data structures from metadata associated with the source data processing system. For example, the migration and replication system may determine the tables stored in database at the source data processing system. The migration and replication system may also, or instead, determine any other data structures in any other form of data storage beyond tables in databases. This information may be determined, for example, by a source resource information determination component 150 or storage information determination component 156 of FIG. 1.

At 304, the migration and replication system may determine the subset of the data structures that are the "largest." In various examples, this subset may be a predetermined number (e.g., 5, 8, 10, 15, 25, etc.) of largest data structures. In examples, the "largest" data structures may be simply the largest data structures by storage volume (e.g., the tables that take up the most bytes of storage). In other examples, one or more proxies for largest data structure may be used. For example, a number of columns in a table may be used to select the subset of 304. For instance, the 8 tables having the greatest number of columns may be selected at 304.

At 306, a "total size" of the subset of largest data structures determined at 304 may be determined. The "total size" may be based on an actual size (e.g., sum of the data storage space occupied by the subset of largest data structures) or a proxy value. For example, where the "largest" tables are those with the greatest number of columns, at 306 the total size of these largest tables may be the total number of columns of this subset. For instance, if the 8 tables having the greatest number of columns are selected at 304, the sum of the number of columns in this subset may be the "total size" determined at 306.

At 308, the number of large object portions of the largest data structures may be determined. In a database, a "large object" may be a data type that holds a large amount of data (e.g., several gigabytes or terabytes). At 308, the columns in the subset of the "largest" tables may identified and then a total number of such columns may be determined. For instance, if the 8 tables having the greatest number of columns are selected at 304, the sum of the number of large object columns in this subset may be the number of large object portions determined at 308.

At 310, the migration data storage resource requirements may be determined using the values determined at 304, 306, and 308. In some examples, a weighting factor may be used to weight one or more of these values. For example, the total number of columns in the subset of the largest tables may be denoted "CCtotal" and the total number of large object columns in the subset of the largest tables may be denoted "CCLOB." Using a weighting factor of $W_1$ for column count, $W_2$ for large object columns, and an added weighing factor of $W_3$ that may be used to accommodate resource variations, a migration data storage requirement value "MRep" in megabytes (MB) may be given in equation 1 below.

$$MRep = (W_1 * CCtotal) + (W_2 * CCLOB) + W_3 \quad (1)$$

In another example, a total number of different types of columns (e.g., columns representing different datatypes) in the subset of the largest tables may be denoted "DT" and a specific coefficient (e.g., weighting factor) for a particular column type "$DT_n$," may be denoted "$W_n$." The total number of columns in the subset of a particular datatype may be denoted "$CC_n$." In this example, the migration data storage requirement value "MRep" in megabytes (MB) may be given in equation 2 below, where "W" may denote the initial instance coefficient.

$$MRep = W + \sum_{n=1}^{DT}(W_n * DT_n * CC_n) \quad (2)$$

At 312, the migration data storage requirements may be provided for use in determining migration data storage resources, for example, by a migration resource determination component 160 or migration storage determination component 166 of FIG. 1.

Figure 4:
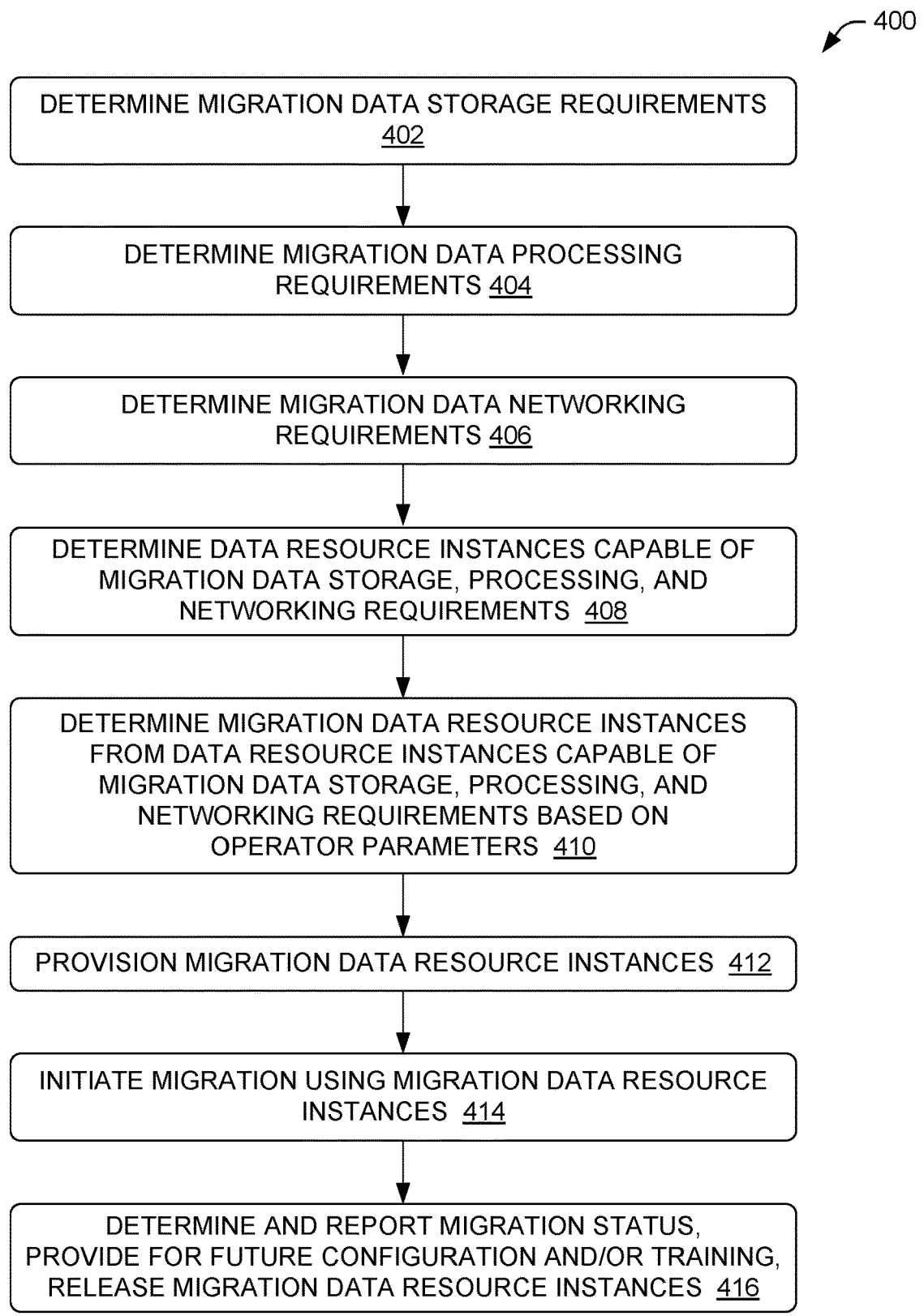
FIG. 4 illustrates a flow diagram of an example method for provisioning migration resources in a migration and replication system.

FIG. 4 is a flow diagram of an illustrative process 400 to facilitate the determination of migration data resources in a migration and replication system. The process 400 may be described at times with reference to the environment 100 and may be performed by the migration and replication system 110, but the process 400 may also, or instead, be performed in other similar and/or different environments by other similar and/or different systems.

At 402, the migration and replication system may determine one or more migration data storage requirements, for example as described herein in regard to FIG. 3 and elsewhere. In examples, such a determination may be made by a migration resource determination component 160 or migration storage determination component 166 of FIG. 1.

At 404, one or more migration data processing requirements may be determined, for example as described herein. In various examples, such processing requirements may be based (e.g., solely or partially) on parameters or preferences indicated by a user or operator of the system being migrated. For example, a request for migration may include a thread, subtask, or processing resource parameter that may be used to determine the migration data processing requirements at 404. In examples, such a determination may be made by a migration resource determination component 160 or migration processing determination component 166 of FIG. 1.

At 406, one or more migration data networking requirements may be determined, for example as described herein. In various examples, such networking requirements may be based on destination system and/or source system capabilities. For example, the capability of a destination network resource to receive data (e.g., at a particular throughput or data rate) and/or the capability of a source network resource to transmit data (e.g., at a particular throughput or data rate) may be take into account in determining one or more migration data networking requirements. In examples, such a determination may be made by a migration resource determination component 160 or migration network determination component 168 of FIG. 1.

At 408, one or more data resources may be determined that may be capable of meeting the requirements determined at 402, 404, and 406. For example, for a certain estimate of storage space needed (e.g., as in the example of FIG. 3), a first number of a first size of storage resources may be determined and a second number of a second size of storage resources may be determined, etc. Referring again to the previous examples, for a migration storage requirement of an estimated 200 terabytes of data, therefore 200 storage resources of 1000 gigabyte capacity each and 40 storage resources of 5000 gigabyte capacity each may be determined at 406.

Similarly, a number of processing component may be determine based on the requirements indicated by a migration request, by an operator, and/or based on other information. For example, if an operator indicates 10 threads or subtasks are to be used, 10 single-threaded processing resources and 5 dual-threaded processing resources may be determined at 408. In examples, such a determination may be made by a migration resource determination component 160 and/or associated components 162, 164, 166, and/or 168 of FIG. 1.

At 410, one or more particular combinations of data storage resources, data processing resource, and/or data networking resources that satisfy the migration requirements may be determined. For example, some data processing resources may be sufficient to satisfy a duration requirement if used with particular types of data storage resources and data networking resources, but not if used with others. In other examples, some combinations of data processing resources and data storage resources may be capable of implementing the requested migration significantly faster than requested if used with particular data networking resources, while other combinations may be slower but still adequate given a requested duration. The slower combination may be selected at 410 in the interest of more efficient usage of resources (e.g., resources of the faster combination may be saved for where they are needed) and lower cost (e.g., the faster resources may be more expensive but are unnecessary in this case). At 410, the combinations of resources that may satisfy requirements such as duration, efficiency, cost, etc. may be determined. In examples, such a determination may be made by a migration resource configuration component 170 of FIG. 1.

At 412, the resources determined at 410 may be provisioned or otherwise allocated for use in the migration. For example, the migration resource configuration component 170 of FIG. 1 may request such provisioning from the provisioning system 138. Alternatively or additionally the resources determined at 410 may be indicated to a user or operator that may then approve or otherwise initiate this provisioning, in some examples after adjusting the recommended resource allocation determined at 410. For example, the migration resource configuration component 170 of FIG. 1 may provide the recommended resources to the migration configuration interface(s) 180 that a user or operator may manipulate to request provisioning of resources from the provisioning system 138.

At 414, the migration may be initiated, in examples following the provisioning of the migration resources. For example, the migration resource configuration component 170 of FIG. 1 may request the initiation of the migration from the migration system 148. The migration resource configuration component 170 may indicate the allocated resources for the migration to the migration system 148. Alternatively or additionally a user or operator that may initiate the migration, for example, via the migration configuration interface(s) 180 that a user or operator may manipulate.

At 416, the migration and replication system may detect a status of the migration (e.g., complete, successful, failed, suspended, etc.). For example, a migration system may proactively notify the migration and replication system upon completion or other termination of the migration. Alternatively, the migration and replication system may be monitoring the migration and may determine that it has stopped (e.g., successfully completed or failed) based on such monitoring. When the migration is complete or otherwise terminated and/or the migration resources are no longer needed, at 416 the migration and replication system may release the migration resources for use in other operations. The migration and replication system may also, at 416, provide migration metrics, status data, and/or any other data for use in training and/or reconfiguring one or more of its associated components and/or models. In examples, the migration resource configuration component 170 and/or the training data generation component 190 of FIG. 1 and/or one or more other components in the environment 100 may perform the operations of 416.

Figure 5:
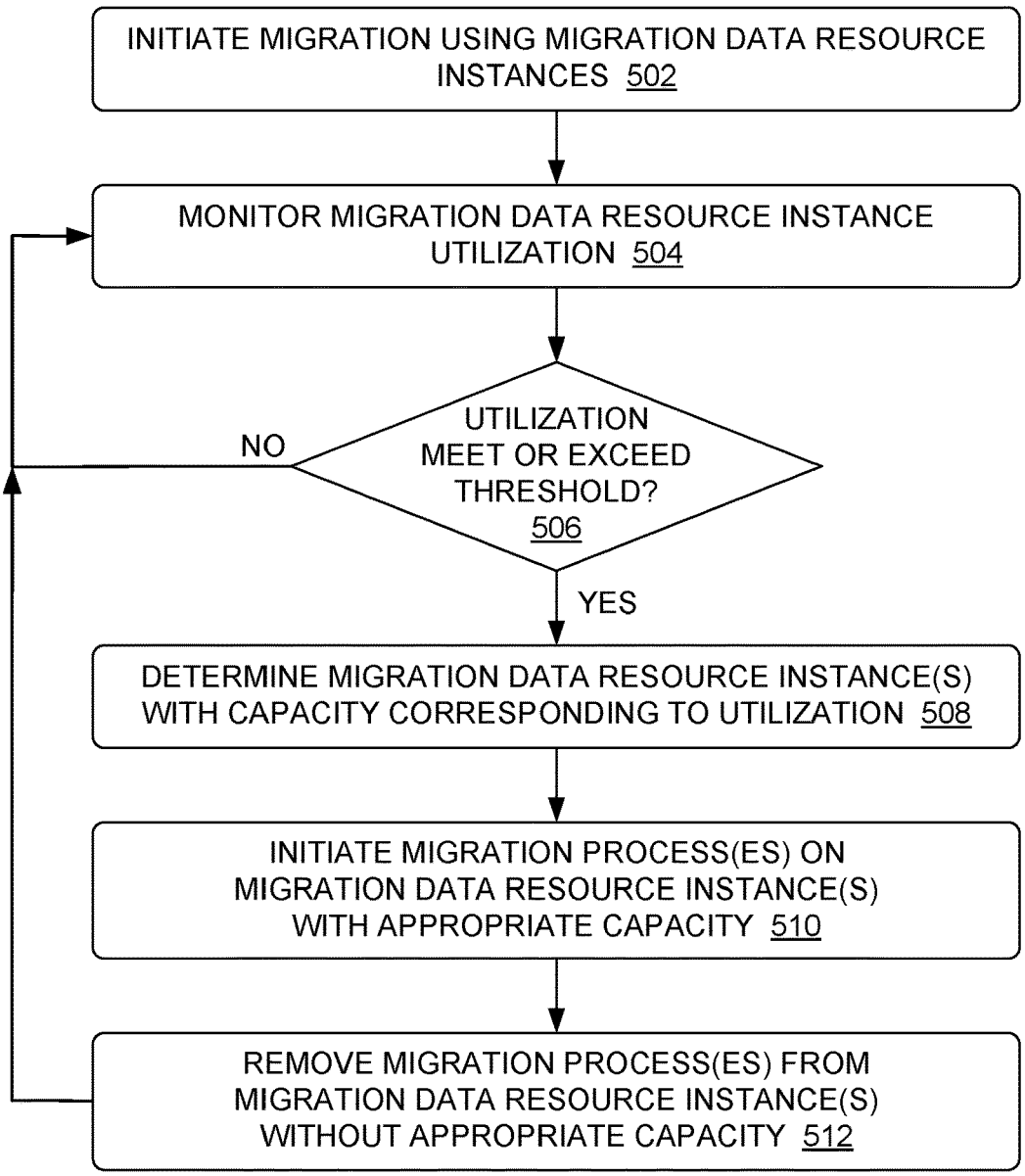
FIG. 5 illustrates a flow diagram of an example method for scaling migration resources in a migration and replication system.

FIG. 5 is a flow diagram of an illustrative process 500 to facilitate the monitoring and adjustment of migration data resources in a migration and replication system. The process 500 may be described at times with reference to the environment 100 and may be performed by the migration and replication system 110, but the process 500 may also, or instead, be performed in other similar and/or different environments by other similar and/or different systems.

At 502, a migration and replication system may initiate a migration as described herein. For example, the migration resource configuration component 170 of FIG. 1 may request the initiation of the migration from the migration system 148. Alternatively or additionally a user or operator that may initiate the migration, for example, via the migration configuration interface(s) 180 that a user or operator may manipulate.

At 504, the migration and replication system may monitor the migration as it is being performed and, in particular, the one or more resources being used to perform the migration. For example, the migration and replication system may monitor the processor utilization of the migration data processing resources, the storage capacity utilization of the migration data storage resources, and/or the throughput rate of the migration networking data storage resources. This monitoring may be performed by the migration resource configuration component 170 of FIG. 1 and/or one or more other components of the migration and replication system 110.

At 506, the migration and replication system may determine whether a monitored resources utilization has met or exceeded a threshold. For example, to ensure that there are adequate resources allocated for a migration, the system may establish an upper bound threshold of processor utilization, network capacity utilization, and/or storage capacity utilization (e.g., 66%, 80%, 85%, 90%, etc. of total capacity). If a resource is determined to meet or exceed such a threshold, the system may take steps to add capacity to the migration resources. In another example, to ensure that there are not wasted resources allocated for a migration, the system may establish a lower bound threshold of processor utilization, network capacity utilization, and/or storage capacity utilization (e.g., 10%, 15%, 20%, 25%, etc. of total capacity). If a resource is determined to meet or fall below such a threshold, the system may take steps to remove capacity from the migration resources. In various examples, different thresholds may be used for different resource types (e.g., processing and storage resources) and/or for individual resources of a same resource type.

If, at 506, no resource is meeting or exceeding a threshold, the migration and replication system may continue to monitor the resources at 504. If a resource is determined to have met or exceeded a threshold (e.g., is greater than an upper bound threshold or lower than a lower bound threshold), at 508, the migration and replication system may determine one or more alternative resources that may be used to improve the efficiency of the migration resource allocation. For example, if a processing resources is operating above a utilization threshold, the migration and replication system may determine one or more other data processing resources with greater processing capacity that may be used to replace one or more of the current migration processing resources. Alternatively, the migration and replication system may determine one or more data processing resources of a same or different capacity that may be added to the current migration processing resources. Likewise, where a resource utilization drops below a lower bound threshold, the migration and replication system may determine a substitute resource with which one or more of the current migration resources may be replaced and/or one or more of the current migration resources to remove from the migration allocation.

At 510, the migration and replication system may allocation and initiate migration processes on the determined substitute resource. Alternatively, at 510 the migration and replication system may remove or add the determined resources from 508 to the migration allocation. At 512, where a resource is replaced, the migration and replication system may remove that resources, for example, once the replacement resource is provisioning and operational and/or after removing migration traffic from the resource to be replaced.

Figure 6:
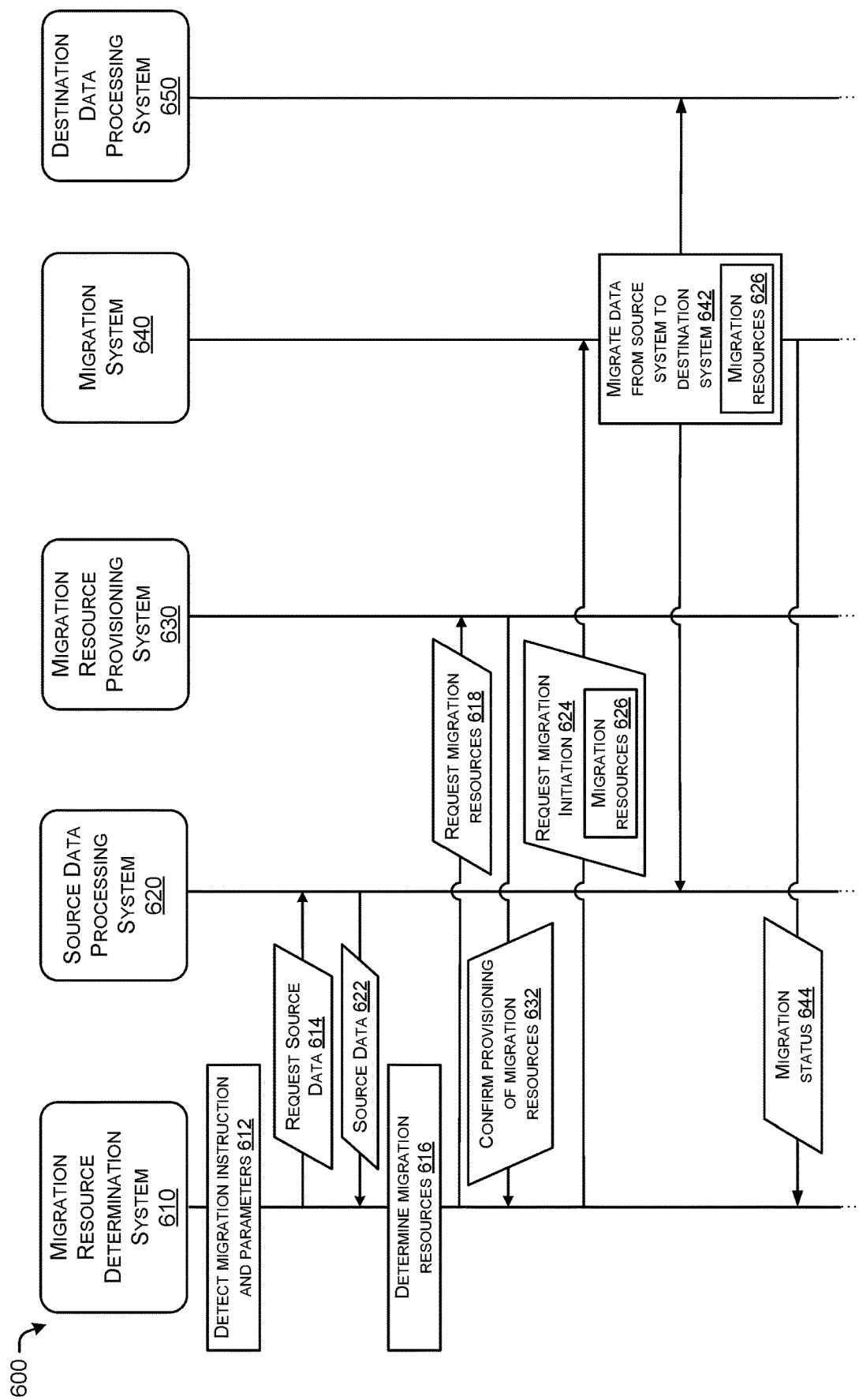
FIG. 6 illustrates an example signal flow that may be performed by components of a migration and replication system.

FIG. 6 is a signal flow diagram illustrating various signals and operations 600 that may be performed by components of a migration and replication system. The signals and operations 600 may be described at times with reference to the environment 100 and may be performed and/or exchanged with or between components of the migration and replication system 110, but the signals and operations 600 may also, or instead, be performed in other similar and/or different environments by other similar and/or different systems.

A migration resource determination system 610 may detect, at operation 612, a migration instruction that may include parameters provided by an operations (e.g., source data processing system, destination data processing system(s), duration, threads, subtasks, start time, end time, etc.). In response to this detection, the migration resources determination system may transmit a request for source data 614 to the source data processing system 620 (e.g., that may have been indicated in the instruction detected at operation 612). The source data processing system 620 may reply with source data 622. In examples, this may include metadata that indicates or otherwise may be used to determine storage estimates, processing resource utilization, etc. as described herein.

At operation 616, the migration resource determination system 610 may determine one or more migration resources. For example, the migration resource determination system may determine one or more data processing resources and/or data storage resources to be provisioned for use in the migration based on the source data 622 and/or parameters included in the instruction detected at 612 or otherwise determined.

The migration resource determination system 610 may transmit the request 618 to the migration resource provisioning system 630 requesting that the resources determined at 616 be provisioned for the requested migration. The migration resource provisioning system 630 may provision these resources and provide a confirmation of such provisioning 632 to the migration resource determination system. This message 632 may include one or more indicators or identifiers of the particular resources that were provisioned for the migration by the migration resource provisioning system 630.

The migration resource determination system 610 may transmit the migration initiation request 324 to the migration system 640 requesting initiation of the migration. This request may include an indication of the migration resources 626. In some examples, the request may omit such an indication and the migration system 640 may determine the resources to use via other means (e.g., based on a migration identifier, etc.).

The migration system 640 may migrate data and/or other resources from the source data processing system 620 to the destination data processing system 650 using the migration resources 626 at operation 642. Once complete or otherwise terminated, the migration system 640 may provide a migration status 644 to the migration resource determination system 610. For example, the migration system 640 may notify the migration resource determination system 610 of a migration success, failure, and/or any other migration status for the migration, as well as metrics and other migration data with status 644.

Figure 7:
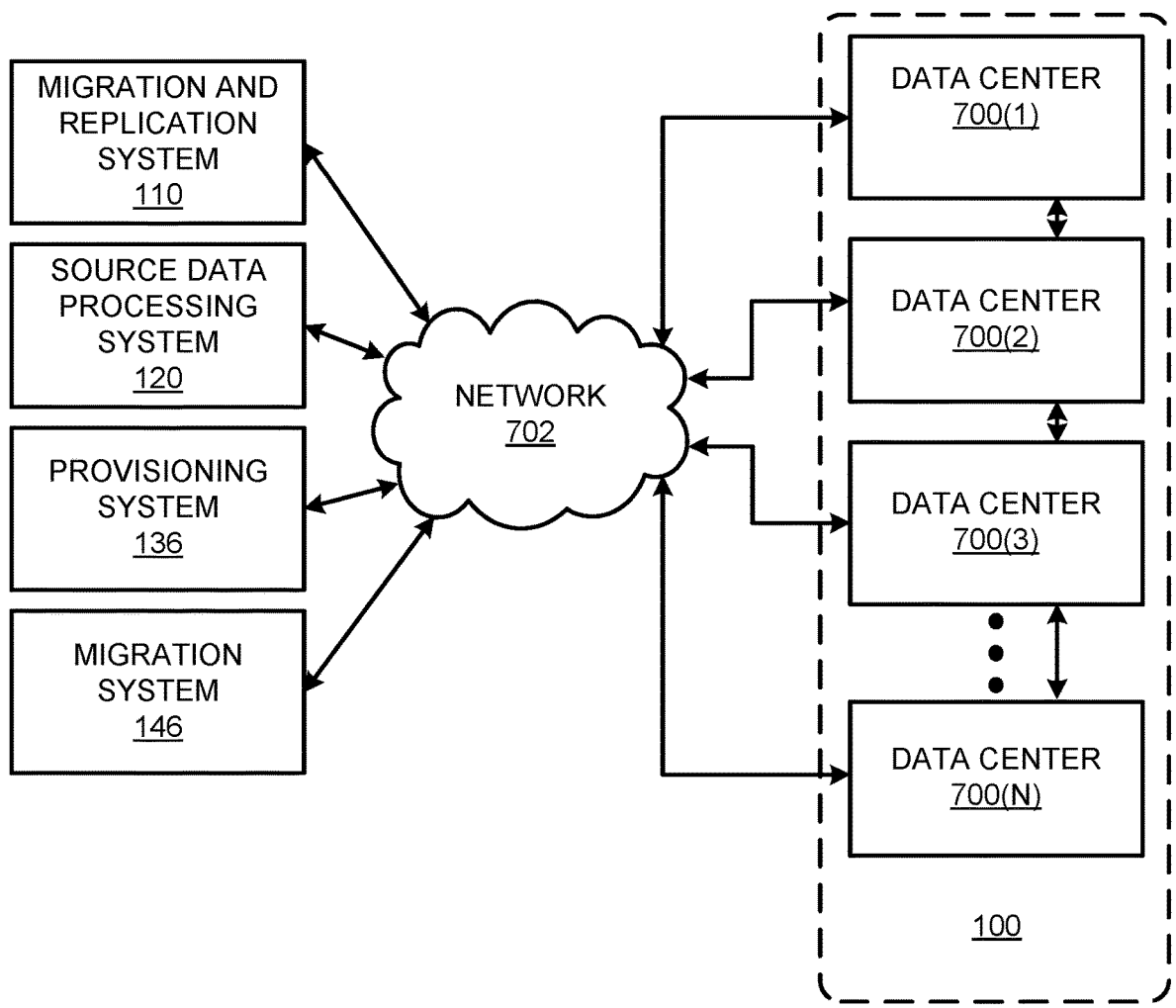
FIG. 7 is a system and network diagram that shows an illustrative operating environment that includes a system that can be configured to implement aspects of the functionality described herein.

FIG. 7 is a system and network diagram that shows an illustrative operating environment that includes a migration and replication system 110, a source data processing system 120, a provisioning system 138, and a migration system 148 that can be configured to implement aspects of the functionality described herein. The systems 110, 120, 138, and 148 can each execute and/or implement various types of computing and network services, such as the data storage and data processing, and/or utilize various computing resources of various types of systems on a permanent or an as-needed basis. Among other types of functionality, the computing resources utilized and/or implemented by the systems 110, 120, 138, and 148, or by a larger system of which one or more of these systems may be a part, can be utilized to implement the various replication operations described herein. One or more of the systems 110, 120, 138, and 148 may be part of a larger system that provides additional computing resources that include, without limitation, data storage resources, data processing resources, virtual machine (VM) instances, networking resources, data communication resources, network services, and other types of resources.

Each type of computing resource utilized and/or implemented at the systems 110, 120, 138, and 148 or by a larger system of which one or more of these systems may be a part, can be general-purpose or can be available in a number of specific configurations. For example, data processing resources can be implemented as physical computers or VM instances in a number of different configurations. The VM instances can be configured to execute applications, including web servers, application servers, media servers, database servers, some or all of the replication operations described above, and/or other types of programs. Data storage resources can include file storage devices, block storage devices, and the like. The systems 110, 120, 138, and 148, or a larger system of which one or more of these systems may be a part, can also be configured to perform other types of operations and/or utilize and/or implement other computing resources not mentioned specifically herein.

The computing resources utilized and/or implement by systems 110, 120, 138, and 148, or a larger system of which one or more of these systems may be a part, may be enabled in one implementation by one or more data centers 700(1), 700(2), 700(3), . . . , 700(N) that may be configured in (partially or wholly) and/or communicative connected to the environment 100. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 8.

The users of the system can access the computing resources, such as systems 110, 120, 138, and 148, and/or any of the computing resources in the environment 100, provided by the system over a network 702, which can be a wide area communication network ("WAN"), such as the Internet, an intranet, an Internet service provider ("ISP") network, or a combination of such networks. For example, and without limitation, a computing device (e.g., the migration and replication system 110) operated by a user of the system can be utilized to access the system by way of the network 702. It should be appreciated that a local-area network ("LAN"), the Internet, or any other networking topology known in the art that connects the data centers to remote users and other users can be utilized. It should also be appreciated that combinations of such networks can also be utilized.

Figure 8:
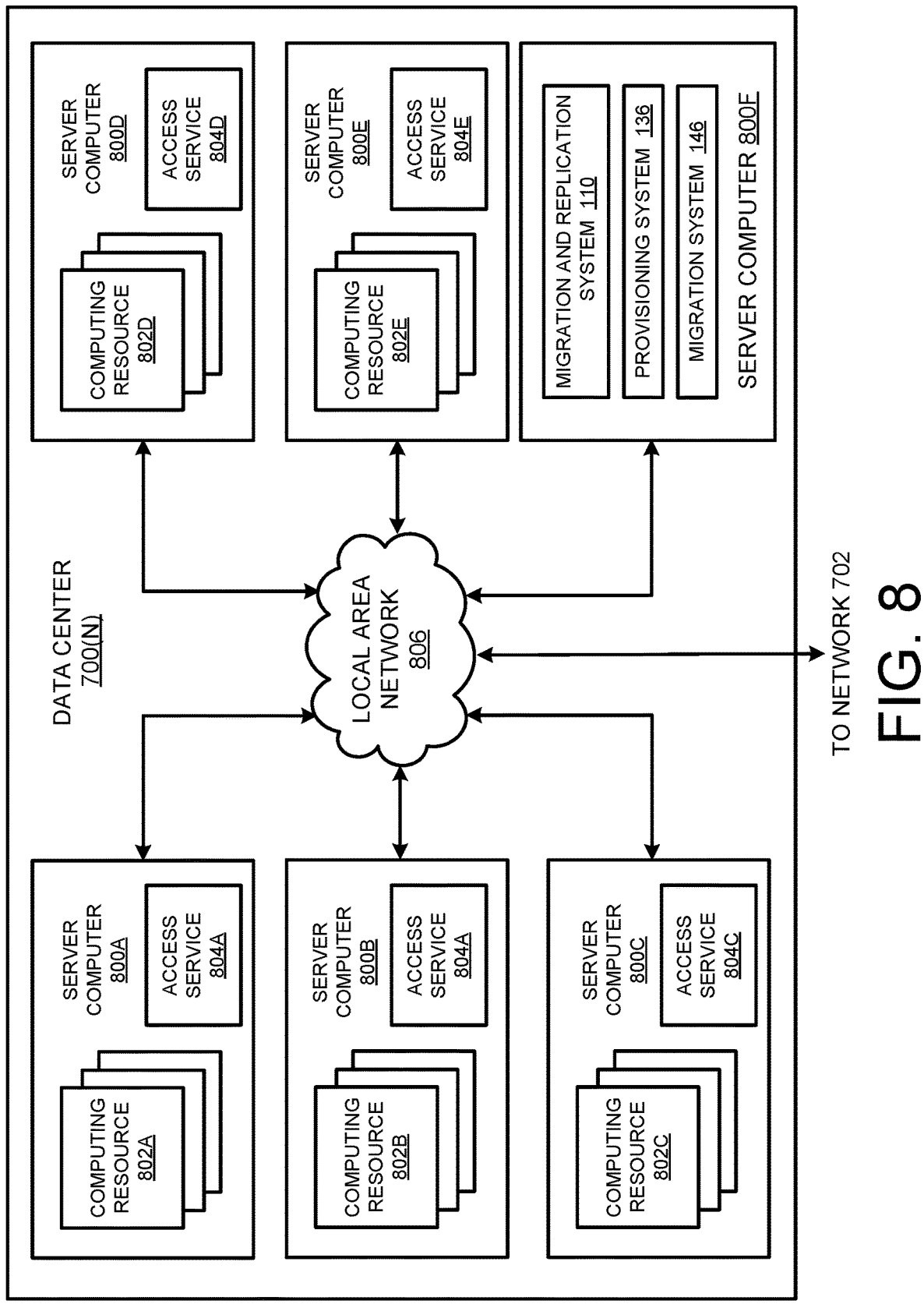
FIG. 8 is a computing system diagram illustrating a configuration for a data center that can be utilized to implement aspects of the technologies disclosed herein.

FIG. 8 is a computing system diagram that illustrates one configuration for a data center 700(N) that can be utilized to implement the systems 110, 120, 138, and 148, as described above in FIGS. 1-6 and/or any other migration and replication system disclosed herein. The example data center 700(N) shown in FIG. 8 includes several server computers 800A-800E (collectively 800) for providing the computing resources 802A-802E (collectively 802), respectively.

The server computers 800 can be standard tower, rackmount, or blade server computers configured appropriately for providing the various computing resources described herein (illustrated in FIG. 8 as the computing resources 802A-802E). As mentioned above, the computing resources 802 may be utilized and/or configured at one or more of systems 110, 120, 138, and 148, or a larger system of which these systems may be a part, and can include, without limitation, analytics applications, data storage resources, data processing resources such as VM instances or hardware computing systems, database resources, networking resources, model execution resources, model training resources, and others. Some of the servers 800 can also be configured to execute access services 804A-804E (collectively 804) capable of instantiating, providing and/or managing the computing resources 802, some of which are described in detail herein.

The data center 700(N) shown in FIG. 8 also includes a server computer 800F that can execute some or all of the software components described above. For example, and without limitation, the server computer 800F can be configured to execute one or more of the systems 110, 120, 138, and 148 and/or one or more components associated therewith. The server computer 800F can also be configured to execute other components and/or to store data for providing some or all of the functionality described herein. In this regard, it should be appreciated that components or different instances of one or more of the systems 110, 120, 138, and 148 can execute on many other physical or virtual servers in the data centers 700 in various configurations.

In the example data center 700(N) shown in FIG. 8, an appropriate LAN 806 is also utilized to interconnect the server computers 800A-800F. The LAN 806 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 700 described with reference to FIG. 7 is merely illustrative and that other implementations can be utilized.

Figure 9:
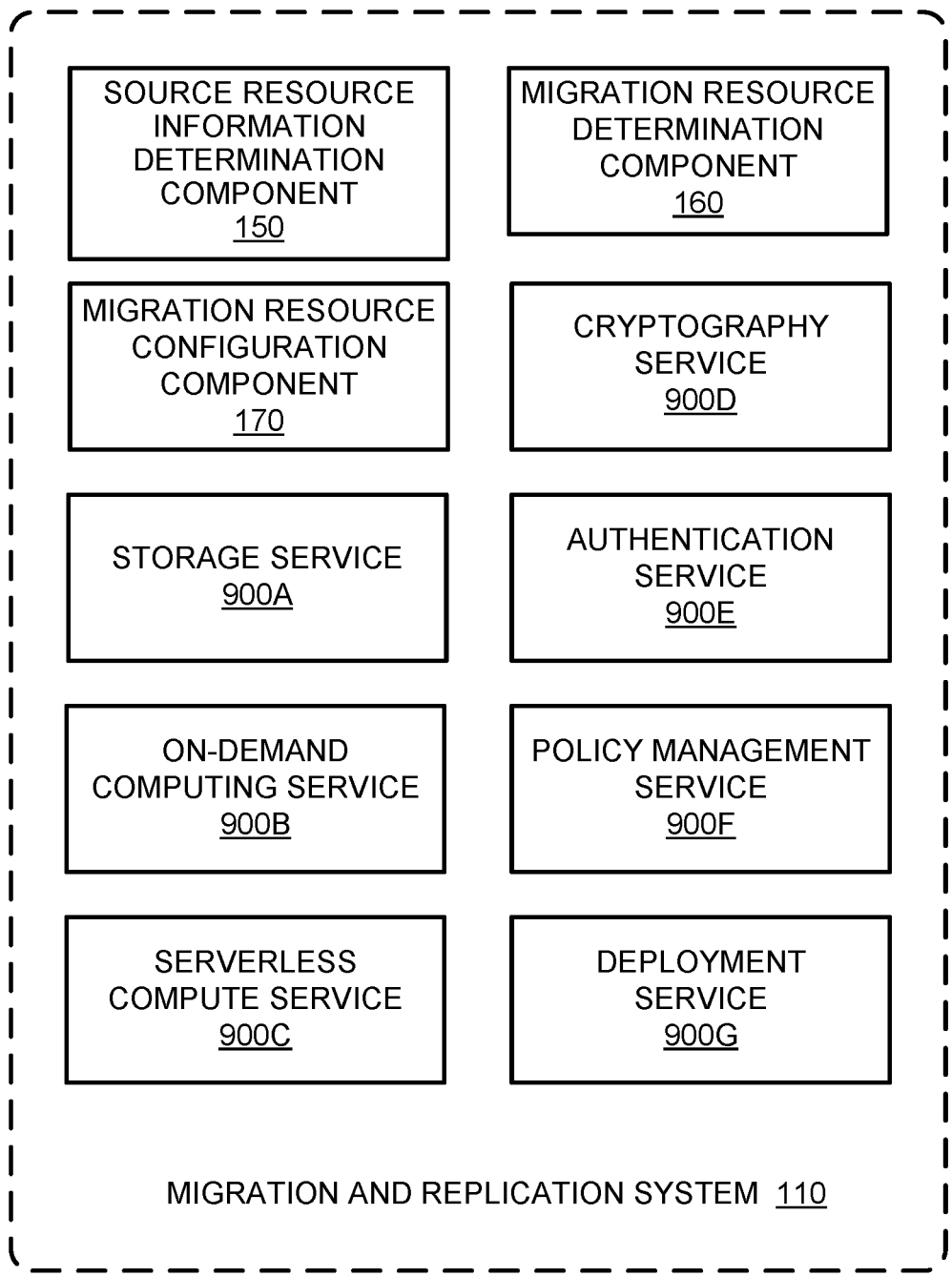
FIG. 9 is a network services diagram that shows aspects of several services that can be provided by and utilized within a system, or a larger system of which the system is a part, which is configured to implement the various technologies disclosed herein.

FIG. 9 is a system services diagram that shows aspects of several services that can be provided by and utilized within the systems 110, 120, 138, and 148 and/or a larger system of which these systems may be a part, which is configured to implement the various technologies disclosed herein. In particular, and as discussed above, these systems, or a larger system of which these systems may be a part, can provide a variety of services to users and other users including, but not limited to, replication services performed by components 150, 160, 170, and/or one or more computing instances performing one or more functions thereof, a storage service 900A; an on-demand computing service 900B; a serverless compute service 900C; a cryptography service 900D; an authentication service 900E; a policy management service 900F; and a deployment service 900G. The system, or a larger system of which the system is a part, can also provide other types of computing services, some of which are described below.

It is also noted that not all configurations described include the services shown in FIG. 9 and that additional services can be provided in addition to, or as an alternative to, the services explicitly described herein. Each of the systems and services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from users of the system and/or from computing resources in the system, or a larger system of which the system is a part. The data stored by the storage service 900A can be obtained from computing devices of users. The data stored by the storage service 900A may also be activity data logged to the storage system 900A that may be functioning as a logging system or service.

The on-demand computing service 900B can be a collection of computing resources configured to instantiate VM instances and to provide other types of computing resources on demand. For example, a user of the system, or a larger system of which the system is a part, can interact with the on-demand computing service 900B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the system, or a larger system of which the system is a part. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 900D. The cryptography service 900D can utilize storage services of the system, or a larger system of which the system is a part, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

The system, or a larger system of which the system is a part, in various configurations, also includes an authentication service 900E and a policy management service 900F. The authentication service 900E, in one example, is a computer system (i.e., collection of computing resources 900B) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the system, or a larger system of which the system is a part. The policy management service 900F can include an interface (e.g., API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 10:
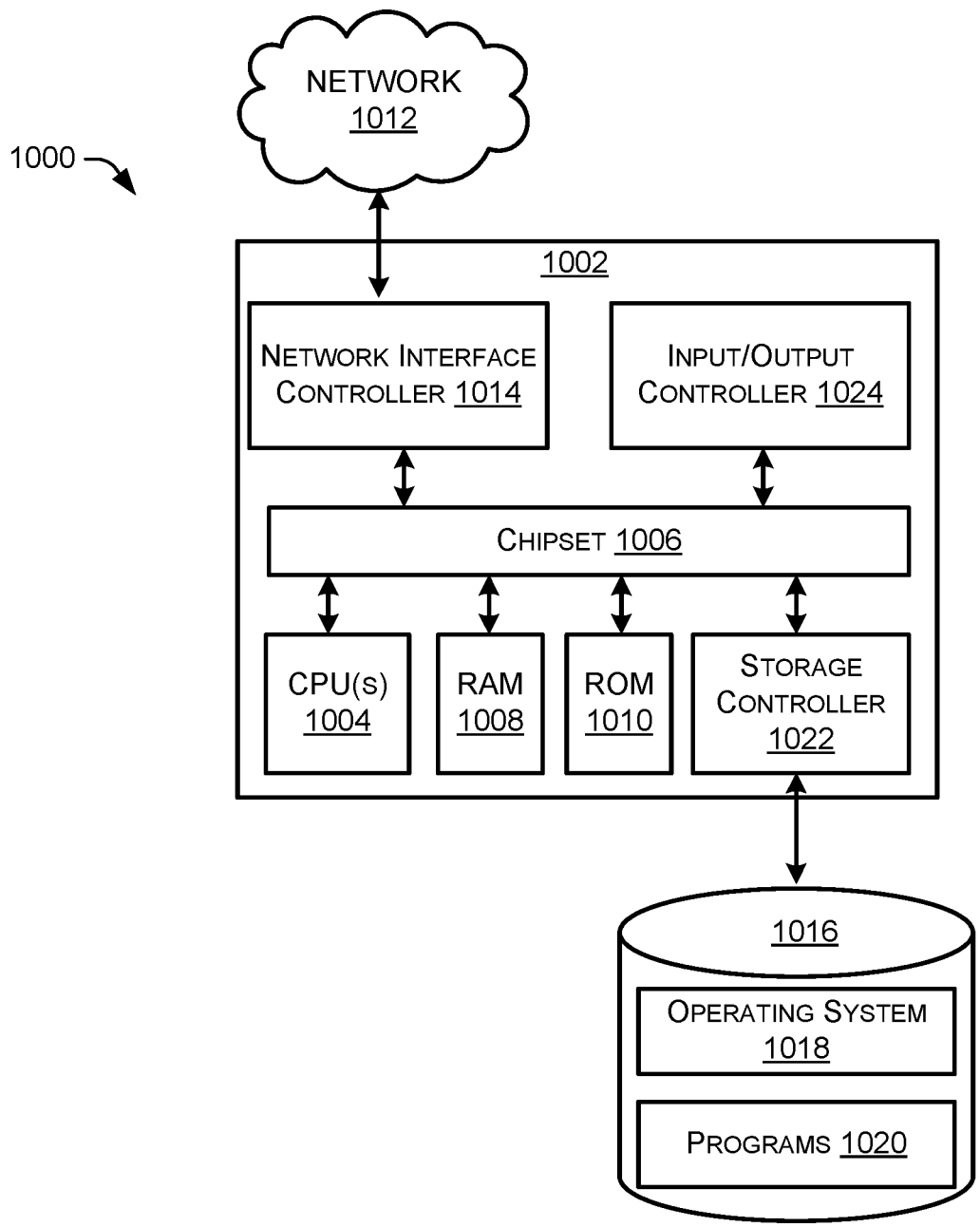
FIG. 10 is a computer architecture diagram showing an illustrative computer hardware architecture for implementing a computing device that can be utilized to implement aspects of the various technologies presented herein.

FIG. 10 shows an example computer architecture for a computer 190 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 1000 may represent architecture for a migration and replication system, a data processing system, and/or other systems and components described herein.

The computer 1000 includes a baseboard 1002, or "motherboard," which may be one or more printed circuit boards to which a multitude of components and/or devices may be connected by way of a system bus and/or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing migration and replication systems for determining and provisioning migration data resources have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:

detecting, at a migration and replication system, a migration request to migrate data stored at a source data processing system to a destination data processing system, the migration request comprising operator preference parameters;

transmitting, from the migration and replication system to the source data processing system based on the migration request, a metadata request for metadata associated with the data stored at the source data processing system;

receiving the metadata at the migration and replication system;

determining, at the migration and replication system based on the metadata, a plurality of migration data storage resources, a plurality of migration data processing resources, and a plurality of migration data networking resources;

determining, at the migration and replication system based on the operator preference parameters, a first subset of the plurality of migration data storage resources, a second subset of the plurality of migration data processing resources, and a third subset of the plurality of migration data networking resources;

provisioning, at the migration and replication system, the first subset of the plurality of migration data storage resources, the second subset of the plurality of migration data processing resources, and the third subset of the plurality of migration data networking resources;

initiating, at the migration and replication system, a migration of the data stored at the source data processing system to the destination data processing system using the first subset of the plurality of migration data storage resources, the second subset of the plurality of migration data processing resources, and the third subset of the plurality of migration data networking resources;

determining, based on monitoring the first subset of the plurality of migration data storage resources, that a utilization of the first subset of the plurality of migration data storage resources meets or exceeds a resource utilization threshold;

in response to determining that the utilization of the first subset of the plurality of migration data storage resources meets or exceeds the resource utilization threshold, at the migration and replication system:
  provisioning a fourth subset of the plurality of migration data storage resources;
  initiating use of the fourth subset of the plurality of migration data storage resources for the migration of the data stored at the source data processing system to the destination data processing system; and
  releasing the first subset of the plurality of migration data storage resources;
determining, at the migration and replication system, that the migration of the data stored at the source data processing system to the destination data processing system has terminated; and
based on determining that the migration of the data stored at the source data processing system to the destination data processing system has terminated, releasing, at the migration and replication system, the fourth subset of the plurality of migration data storage resources, the second subset of the plurality of migration data processing resources, and the third subset of the plurality of migration data networking resources.

2. The method of claim 1, further comprising:
determining, during the migration of the data stored at the source data processing system to the destination data processing system, that a utilization rate of a first data processing resource of the first subset of the plurality of migration data processing resources meets or exceeds a utilization threshold; and
based on determining that the utilization rate of the first data processing resource meets or exceeds the utilization threshold:
  provisioning a second data processing resource;
  associating the second data processing resource with the first subset of the plurality of migration data processing resources;
  initiating a migration process associated with the migration of the data stored at the source data processing system to the destination data processing system at the second data processing resource;
  disassociating the first data processing resource from the first subset of the plurality of migration data processing resources; and
  releasing the first data processing resource.

3. The method of claim 1, wherein determining the plurality of migration data storage resources comprises:
determining, based on the metadata, a plurality of data structures associated with the data stored at the source data processing system;
determining a predetermined number of largest data structures from among the plurality of data structures;
determining a first storage size for each of the largest data structures;
determining a second storage size for large object data stored at each of the largest data structures; and
determining the plurality of migration data storage resources based on the first storage size and the second storage size.

4. A method comprising:
detecting, at a replication system, a migration request to migrate data stored at a source data processing system to a destination data processing system, the migration request comprising one or more operator preference parameters;
determining, at the replication system and based at least in part on one or more attributes of the data stored at the source data processing system, a plurality of migration data resources;
determining, at the replication system and based at least in part on the one or more operator preference parameters, a first subset of the plurality of migration data resources;
provisioning the first subset of the plurality of migration data resources;
initiating, by the replication system, a migration of the data stored at the source data processing system to the destination data processing system using the first subset of the plurality of migration data resources;
determining, during the migration, that a utilization of the first subset of the plurality of migration data resources meets or exceeds a resource utilization threshold; and
in response to determining that the utilization of the first subset of the plurality of migration data resources meets or exceeds the resource utilization threshold:
  provisioning a second subset of the plurality of migration data resources; and
  continuing, by the replication system, the migration of the data stored at the source data processing system to the destination data processing system using the second subset of the plurality of migration data resources.

5. The method of claim 4, wherein initiating the migration of the data stored at the source data processing system comprises transmitting an indication of the first subset of the plurality of migration data resources to an operator of the source data processing system.

6. The method of claim 4, wherein determining the first subset of the plurality of migration data resources comprises determining one or more migration data processing resources from among the plurality of migration data resources based at least in part on a number of migration subtasks indicated in the one or more operator preference parameters.

7. The method of claim 4, wherein determining the plurality of migration data resources comprises determining one or more migration data storage resources based at least in part on the one or more attributes of the data stored at the source data processing system.

8. The method of claim 7, wherein the one or more attributes of the data stored at the source data processing system comprise one or more of:
  a first number of largest data structures of the data stored at the source data processing system;
  a second number of columns of the largest data structures;
  a third number of large object columns of the largest data structures; or
  a weighting factor associated with the large object columns.

9. The method of claim 4, wherein determining the plurality of migration data resources comprises determining one or more migration networking storage resources based at least in part on one or more of one or more migration data processing resources or one or more migration data storage resources.

10. The method of claim 4, further comprising:
monitoring utilization of the first subset of the plurality of migration data resources during the migration of the data stored at the source data processing system; and
modifying the first subset of the plurality of migration data resources based at least in part on the monitoring.

11. The method of claim 10, wherein modifying the first subset of the plurality of migration data resources comprises adding one or more data resources to the first subset of the plurality of migration data resources based at least in part on determining, based at least in part on the monitoring, that one or more of the first subset of the plurality of migration data resources are overutilized.

12. The method of claim 10, wherein modifying the first subset of the plurality of migration data resources comprises removing one or more data resources from the first subset of the plurality of migration data resources based at least in part on determining, based at least in part on the monitoring, that one or more of the first subset of the plurality of migration data resources are underutilized.

13. The method of claim 10, wherein modifying the first subset of the plurality of migration data resources comprises replacing, based at least in part on the monitoring, one or more of the first subset of the plurality of migration data resources.

14. A system comprising:
one or more processors; and
one or more computer-readable media storing computer-executable instructions that, when executed by the one or more processors, cause a replication system to perform operations comprising:
detecting a request to migrate data stored at a source data processing system to a destination data processing system;
determining one or more attributes of the data stored at the source data processing system based at least in part on metadata associated with the data stored at the source data processing system;
determining a plurality of migration data resources based at least in part on the one or more attributes of the data stored at the source data processing system;
determining a first subset of the plurality of migration data resources;
initiating a migration of the data stored at the source data processing system to the destination data processing system using the first subset of the plurality of migration data resources;
determining, during the migration, that a utilization of the first subset of the plurality of migration data resources meets or exceeds a resource utilization threshold; and
in response to determining that the utilization of the first subset of the plurality of migration data resources meets or exceeds the resource utilization threshold:
provisioning a second subset of the plurality of migration data resources; and
continuing, by the replication system, the migration of the data stored at the source data processing system to the destination data processing system using the second subset of the plurality of migration data resources.

15. The system of claim 14, wherein the first subset of the plurality of migration data resources comprises at least one data storage resource, at least one data processing resource, and at least one data networking resource.

16. The system of claim 15, wherein determining the plurality of migration data resources comprises determining the at least one data storage resource based at least in part on a datatype stored in one or more data structures of the data stored at the source data processing system.

17. The system of claim 15, wherein determining the first subset of the plurality of migration data resources comprises determining the at least one data processing resource based at least in part on a number of processes indicated in a parameter of one or more operator preference parameters included in the request.

18. The system of claim 15, wherein determining the first subset of the plurality of migration data resources comprises determining the at least one data processing resource based at least in part on a migration duration indicated in a parameter of one or more operator preference parameters included in the request.

19. The system of claim 14, wherein the operations further comprise modifying the first subset of the plurality of migration data resources based at least in part on monitoring the first subset of the plurality of migration data resources during the migration.

20. The system of claim 19, wherein modifying the first subset of the plurality of migration data resources comprises adjusting, based at least in part on the monitoring, one or more of a processing capacity, networking capacity, or a data storage capacity of one or more of the first subset of the plurality of migration data resources.

* * * * *

UNITED STATES PATENT AND TRADEMARK OFFICE
CERTIFICATE OF CORRECTION

| | | |
|---|---|---|
| PATENT NO. | : 12,367,185 B1 | Page 1 of 1 |
| APPLICATION NO. | : 18/067137 | |
| DATED | : July 22, 2025 | |
| INVENTOR(S) | : Krit Gupta et al. | |

It is certified that error appears in the above-identified patent and that said Letters Patent is hereby corrected as shown below:

In the Specification

Column 14, Line 63, delete "operator system" and insert -- operator system. --.

Column 17, Line 16, delete "denoted "CCtotaf" and" and insert -- denoted "CCtotal" and --.

Column 23, Line 52, delete "functions thereof, a" and insert -- functions thereof; a --.

Signed and Sealed this
Thirtieth Day of September, 2025

John A. Squires
*Director of the United States Patent and Trademark Office*